United States Patent [19]

Moser et al.

[11] Patent Number: 5,277,738
[45] Date of Patent: Jan. 11, 1994

[54] PROCESS AND DEVICE FOR ONE- OR TWO-SIDED STRIPPING OF PROTECTIVE FILMS

[75] Inventors: Josef Moser, Annaberg; Thomas Brötzner, Wals; Markus Köll, Oberalm; Gregor Gehrer, Hallein; Alfred Nowak, Klagenfurt, all of Austria

[73] Assignee: Anger Electronic Ges.m.b.H. EMCO Innovations Center, Taxach, Austria

[21] Appl. No.: 963,458

[22] Filed: Oct. 20, 1992

[30] Foreign Application Priority Data

Jul. 2, 1992 [DE] Fed. Rep. of Germany ....... 4221703

[51] Int. Cl.⁵ .................. B32B 35/00; B32B 31/20
[52] U.S. Cl. .................. 156/308.2; 156/344; 156/583.1; 156/584; 242/115
[58] Field of Search .............. 156/344, 584, 308.2, 156/285, 583.1; 271/97, 280, 281, 900; 242/115; 226/96, 196

[56] References Cited

U.S. PATENT DOCUMENTS

| | | | |
|---|---|---|---|
| 619,692 | 2/1899 | Perry | 242/115 |
| 1,595,478 | 8/1926 | Minton | 271/97 X |
| 3,891,206 | 6/1975 | Bar-On | 271/900 X |
| 3,981,085 | 9/1976 | Franko | 271/900 X |
| 4,961,817 | 10/1990 | Seki | 156/584 |
| 4,981,548 | 6/1991 | Poll | 156/584 |

Primary Examiner—David A. Simmons
Assistant Examiner—Mark A. Osele
Attorney, Agent, or Firm—Robbins, Berliner & Carson

[57] ABSTRACT

A process and a device are described for one- or two-sided stripping of protective films from board-shaped objects, whereby the protective film is first raised at the leading edge of the circuit board and guided to a takeup reel via a transport mechanism. To assure that the stripping moment of the protective films on the circuit boards is as slight as possible, provision is made that the edge of the protective film is first scratched with extensible hollow needles and raised with a blast of air and that, in the course of the continuing advance of the circuit board, the protective film is lifted onto plate-shaped guide blades and transported away.

11 Claims, 5 Drawing Sheets

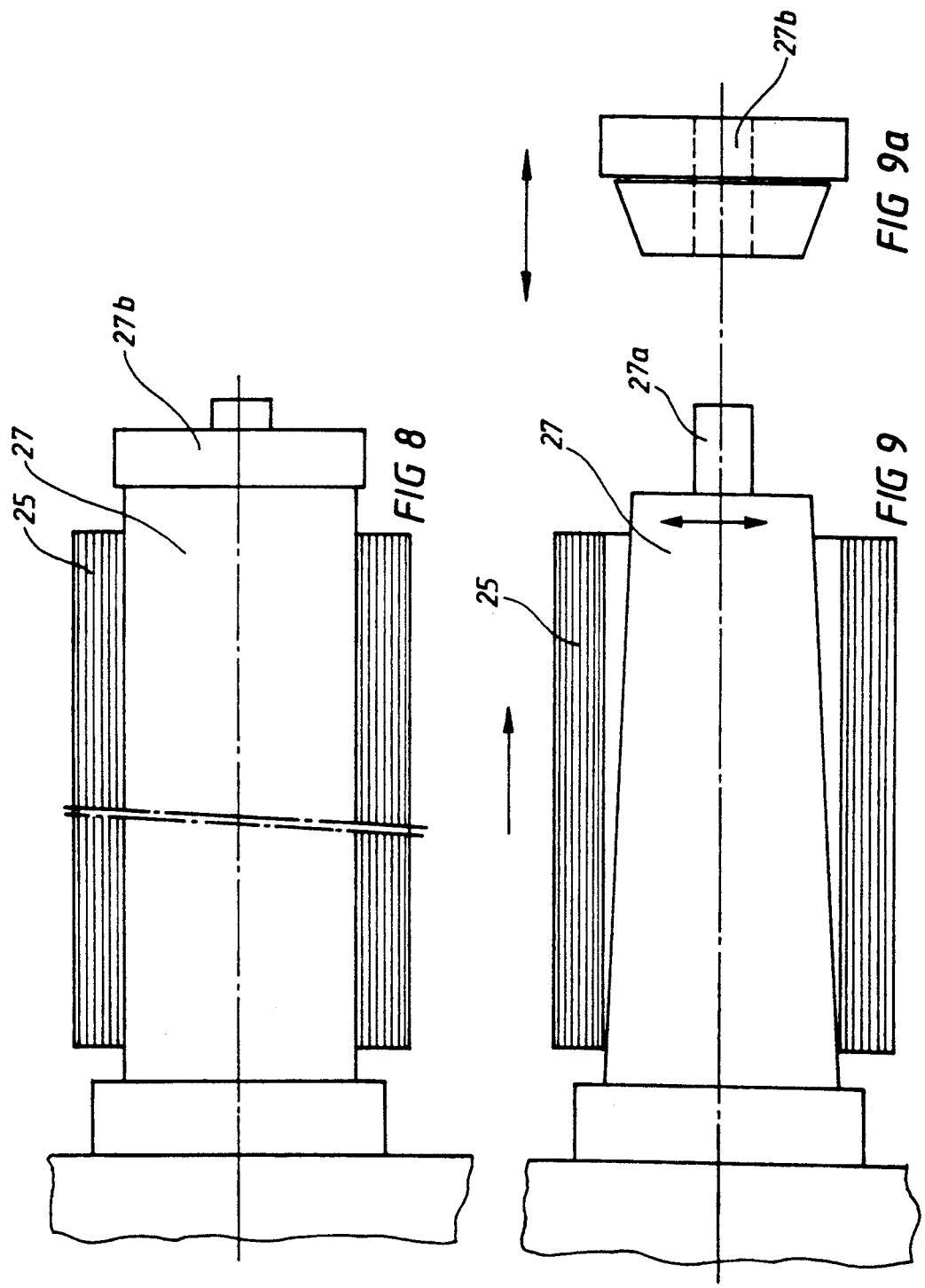

PROCESS AND DEVICE FOR ONE- OR TWO-SIDED STRIPPING OF PROTECTIVE FILMS

BACKGROUND OF THE INVENTION

The present invention relates to a process and a device for one- or two-sided stripping of protective films from board-shaped objects or substrates, in particular in the case of copper-masked circuit boards which are coated with continuous protective films.

This general type of process is described in EP 0 236 730 B1, whereby the protective films are first detached and then stripped over an angular sector of 90°. However, with the large angle between the protective film to be stripped and the substrate, it is impossible to avoid disadvantageous forces on the substrate, which forces could exert a negative effect on the surface of the circuit board or the substrate. In the prior art process, a relatively great stripping moment acts on the board-shaped objects such that, in particular, extremely thin circuit boards cannot be separated from the protective film without difficulty.

Yet another process and device of the general type mentioned above are known from DE 37 00 615 A1, whereby a part of the protective film is fused onto a stripping film and likewise stripped at an angle of approximately 90°, whereby relatively great stripping moments likewise act disadvantageously on the substrate.

The object of the present invention is to refine a process and a device for one- or two-sided stripping of protective films of the type mentioned in the introduction such that the protective films can be stripped from one or both sides of board-shaped objects simply, reliably, and cost-effectively without the effects of significant stripping moments.

SUMMARY OF THE INVENTION

According to the present invention, there is provided methods and apparatus for one- or two-sided stripping of protective films from board-shaped objects or substrates, in particular in the case of copper-masked circuit boards, which are coated with continuous protective films, whereby the protective film is raised on the edge of the substrates and guided via a transport mechanism to a takeup reel, whereby a protective film is thermally bonded with the preceding, already stripped protective film, wherein the substrate with the leading edge of the protective film is precisely positioned and the protective film is first scratched on the edge of the substrate with extensible hollow needles and raised with a blast of air and in the course of the continued advancement of the substrate the protective film is lifted at a sharp angle of the back of the needle along the hollow needle onto plate-shaped guide blades.

BRIEF DESCRIPTION OF THE DRAWINGS

The invention may be better understood with reference to the accompanying drawings, in which:

FIG. 8 depicts the rolled protective film on a takeup roller shaft;

FIG. 9 shows the takeup roller shaft in the slack state in conical form; and

FIG. 9a shows the tension cone of the takeup roller shaft.

DETAILED DESCRIPTION OF THE INVENTION

Figure 1:
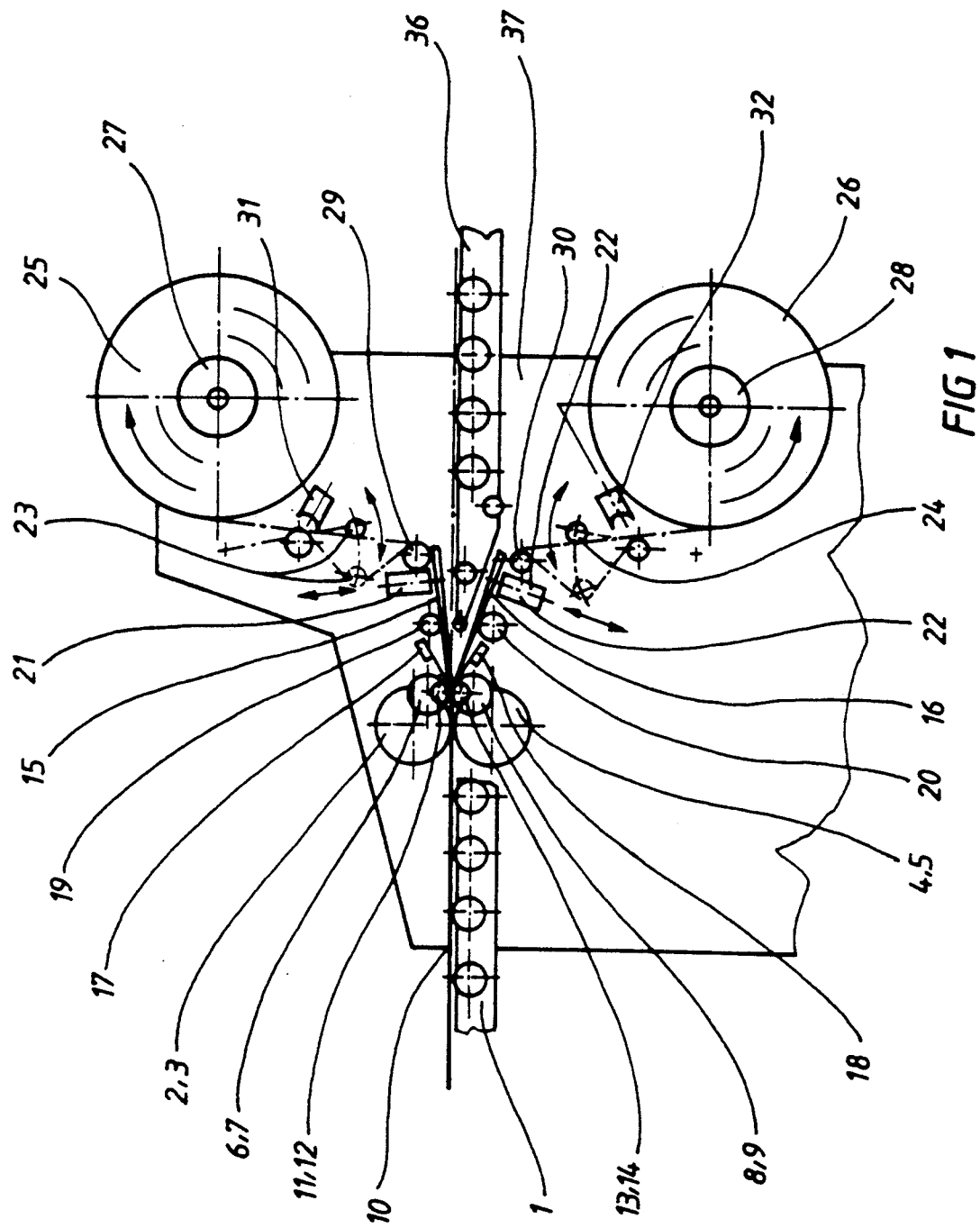
FIG. 1 illustrates the process and apparatus for one- or two-sided stripping of protective films in a schematic side view.

In general, a process in accordance with the present invention provides that the protective film is first scratched or scored in the border area by hollow needles and lifted with a blast of air and that then as the process continues with the forward movement of the circuit board the raised protective films are lifted onto plate-shaped guide blades which approach at a sharp angle in the raised region of the protective films.

According to this solution, even particularly thin circuit boards or substrates can be separated from the protective film since the stripping region of the protective film has a sharp angle to the lifting onto the guide blades and thus high operationally reliability is also assured.

The device provides that rollers first feed the circuit board precisely to the guide blades, whereby the hollow needles first scratch or score the edges of the protective films and raise them with a blast of air and as the circuit board continues to pass through, the protective film runs up over the hollow needle onto the inserted guide blades.

The upper guide blade is linked by a mechanical coupling with the upper rollers. This yields an automatic adjustment to different board formats and thicknesses. The plate-shaped guide blades are disposed at a sharp angle to each other. The protective film is directed over the guide blades and the stationary guide blades engage in the region of the protective film which is raised at a very slight angle, such that only very low stripping moments can act on the circuit board. This yields a universal application of the device, i.e., a completely automatic or independent adjustment to the different board formats and thicknesses. When the guide blade is raised to adapt to a different board thickness, the upper hollow needle is simultaneously repositioned along with it. The stripped protective film is suitably directed for disposal to a takeup reel where the protective film is formed into rollers free of foreign material.

In an advantageous embodiment, provision is made in the process that the protective film in the stripped starting region is thermally bonded on the guide blade to the end region of a preceding, already stripped protective film without any foreign elements. This is advantageous in that the protective film can be transported away appropriately and that, furthermore, rollers free of foreign material can be formed on a reel.

Furthermore, it is advantageous that the plate-shaped guide blades have a distance between each other such that even relatively warped circuit boards can pass through the space between the guide blades in the processing direction. In this embodiment of the process, even warped circuit boards can pass without difficulty through the space between the guide blades in the continuous process.

In an advantageous embodiment of the device, provision is made that the plate-shaped guide blades taper in the starting region and enclose a sharp angle between them, whereby the guide blades have a greater distance between them at the edge region than in the central region. In connection with the pointed beginning region of the guide blades, these blades may be inserted slightly into the angle between the circuit board and the raised protective film such that the protective film can be lifted very reliably onto the guide blades.

It is further advantageous that a suction unit is applied to the separated protective films on the guide blade, where the starting region of the raised protective film is thermally bonded with the end region of a preceding, already stripped protective film. Through the application of the suction unit or the execution of the thermal bonding on the guide blades themselves, the substrate is relieved of strain such that during thermal bonding no disadvantageous forces can act on the substrate.

In the continuing course of the conveying away of the protective film, it is advantageous that guide rollers as well as compensating rollers and clamping beams are provided to guide the protective film. An advantageous refinement is presented in that the protective films form a coreless roll, free of foreign material, with tensible takeup roller shafts provided.

In the following, the invention is explained in greater detail with reference to drawings depicting only one embodiment. Additional characteristics and advantages essential to the invention are revealed by the drawings and their description.

FIG. 1 shows the intake platform 1, where the circuit board 10 with the protective films 10a, 10b is fed into the stripping device according to FIG. 2, whereby feed rollers 2, 3 are provided above and additional feed rollers 4, 5 are provided below.

The circuit board 10 is guided very precisely above into the rollers 6, 7, with additional rollers 8, 9 provided below.

It is also possible to see in FIG. 1 that a blower unit 17, 18 is applied to the circuit board 10, whereby the protective film is first scratched and raised and also guide blades 15, 16 approach the circuit board 10 in the scratched region of the protective film 10a, 10b as it continues to be transported.

The loosened protective film is guided onto the guide blades 15, 16, whereby suction units 21, 22 approach the protective film and execute a thermal fusion.

The protective film bonded with the end of a preceding, already stripped protective film present at the beginning of the process is guided away via guide rollers 29, 30, whereby compensating rollers 23, 24 as well as clamping beams 31, 32 are provided. The stripped protective film is further guided to an uptake reel 25, 26, whereby rollers of the stripped protective film free of foreign material are formed on takeup roller shafts 27, 28.

The circuit board further leaves the device on a discharge platform 36 which is provided on a machine frame 37, with the possibility that driven rollers may also be provided.

For easier diversion of the stripped protective film by the guide blades 15, 16, it is also possible to provide film transport rollers 19, 20.

Figure 2:
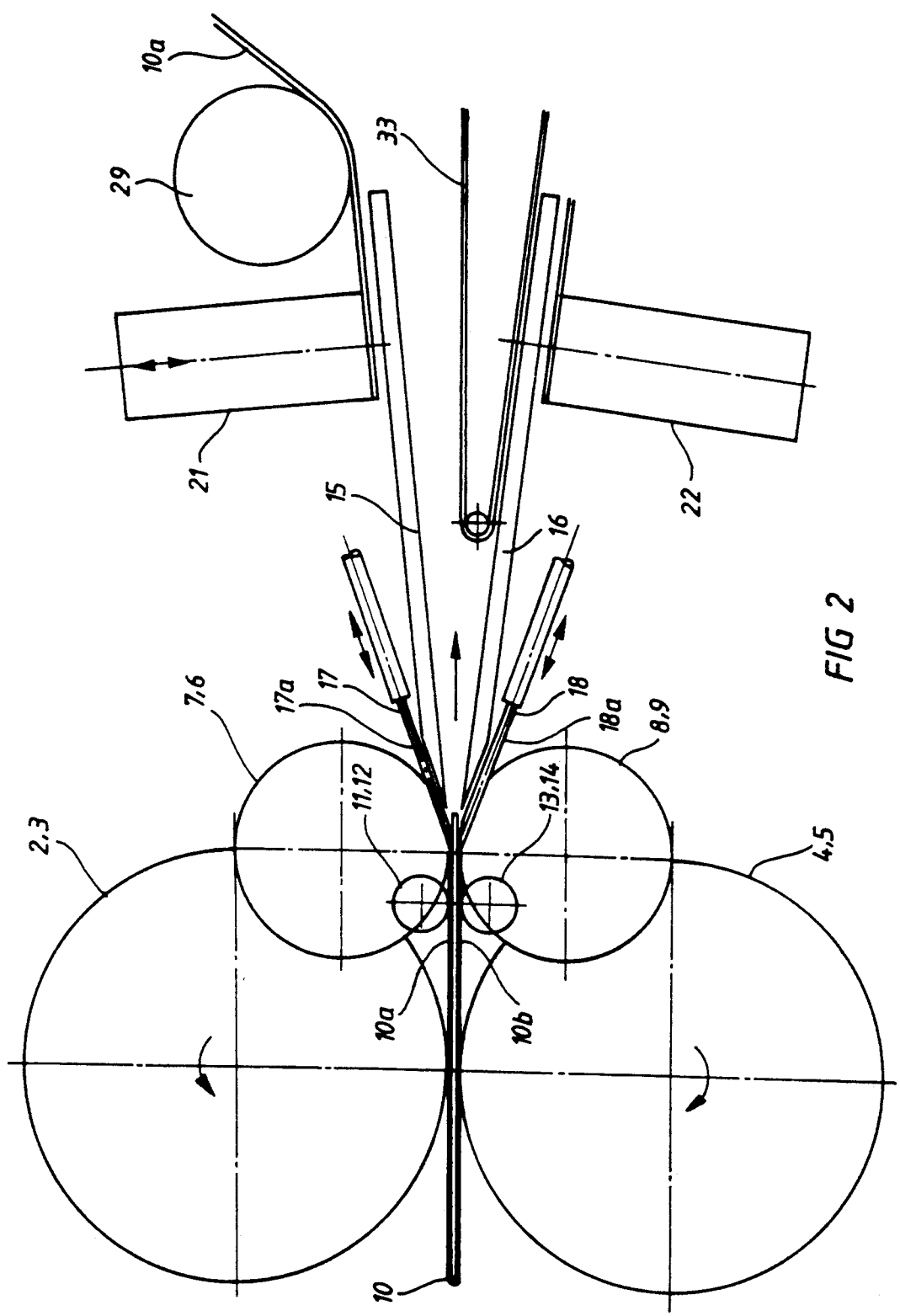
FIG. 2 depicts apparatus according to FIG. 1 in the region of the edge of the circuit board in an enlarged view.

FIG. 2 reveals the function of the blower units 17, 18 in greater detail, whereby hollow needles 17a, 18a scratch or peel the beginning region of the protective films 10a, 10b and a blast of air is further applied to the protective film via the hollow needles 17a, 18a, resulting in a raising of the protective film 10, 10b.

The scratcher-blower units 17, 18 can be advanced to the leading edge of the board in front of the guide blades 15, 16, whereby film edge detection 11, 12 or 13, 14 is provided.

FIG. 2 reveals that the rollers 2, 3 or 4, 5 guide the circuit board 10 with the protective film 10a, 10b precisely onto the guide blades 15, 16 or onto the needles 17a, 18a.

The upper rollers 2, 3 as well as the blades 15, 16 and the needles 17a, 18a are positioned in fixed zones relative to each other and are on vertical slides not shown here.

Through the design of the blower units 17, 18 with the advancing of the hollow needles 17a, 18a it is possible to process flexible board thicknesses without any adjustment.

The pressure between the upper rollers 2, 3 and the lower rollers 4, 5 is designed such that it can be adjusted.

FIG. 2 also reveals that the circuit board 10 is further transported away via a conveyor belt 33.

FIG. 2 further reveals that the thermal bonding of the protective films to each other is performed by means of suction units 21, 22, whereby the suction units 21, 22 approach the guide blades 15, 16 and thus the circuit board 10 itself is completely relieved of any fusion pressure or the like.

It may also be seen that the stripping of the protective films 10a, 10b according to FIG. 2 and additional FIGS. 4 through 7 occurs at a relatively acute angle alpha, such that the circuit board 10 is largely relieved of stripping moments.

Figure 3:
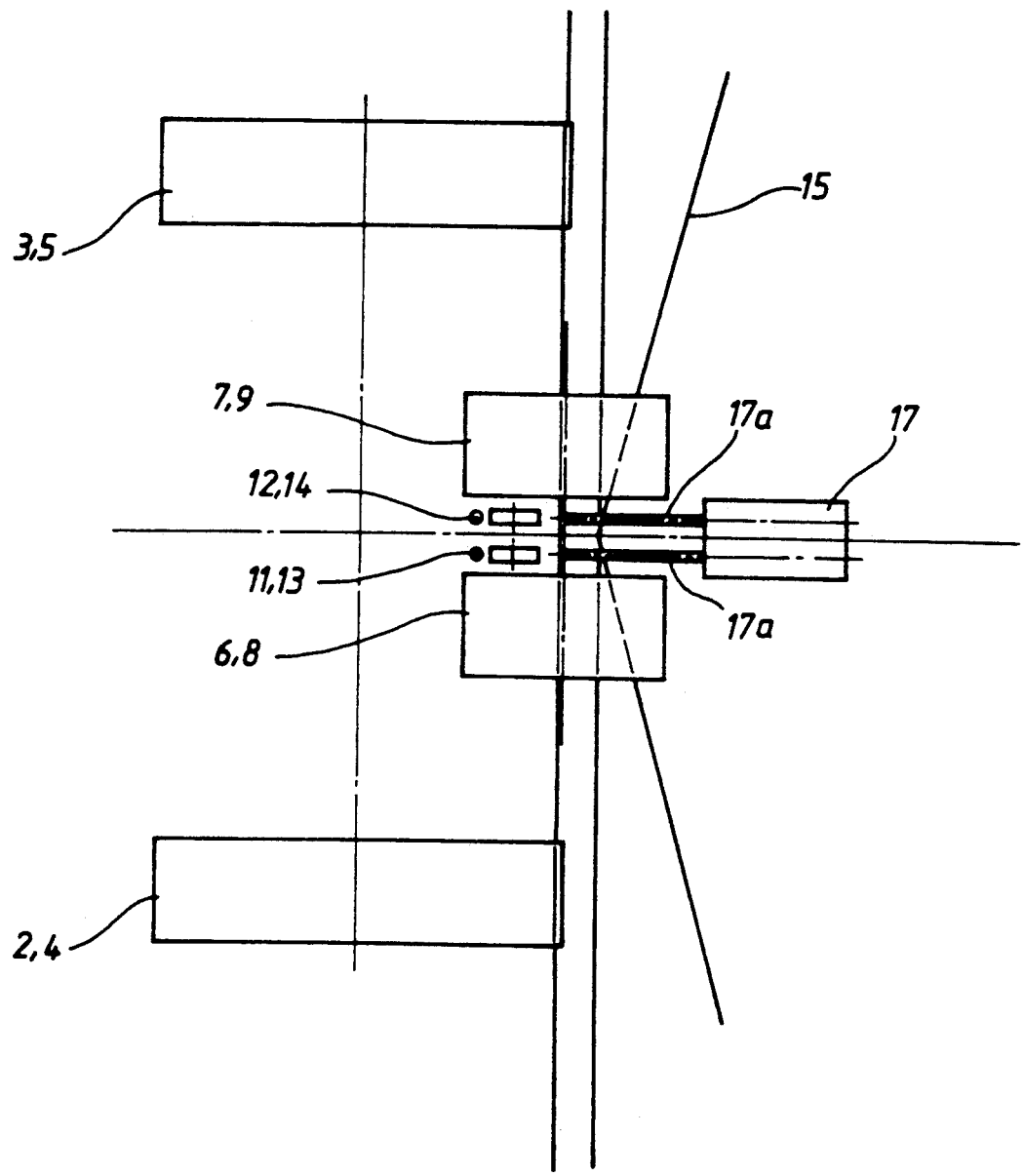
FIG. 3 is a schematic top view of the device.

FIG. 3 depicts the paired disposition of the hollow needles 17a in the blower unit 17, whereby it is obvious that the blade 15 has a tapered beginning region and thus can particularly advantageously accommodate the loosened protective films 10a, 10b according to FIG. 2.

FIG. 3 reveals that the intake rollers 2, 4 or 3, 5 pull the circuit board 10 in and further that the rollers 7, 9 or 6, 8 guide the circuit board precisely such that the hollow needle 17a of the blower unit 17 contacts the edge of the film very precisely and scratches and raises the protective film there.

In FIGS. 4 through 7 the function of the stripping of the protective film 10a, 10b is explained in conjunction with the blower units 17, 18 and the guide blades 15, 16.

Figure 4:
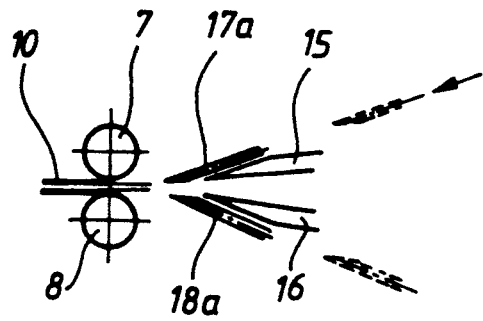
FIG. 4 illustrates a circuit board with the protective film at the beginning of the stripping process with the hollow needles positioned.

FIG. 4 reveals that the circuit board 10 is first centered between the rollers 7, 8 and that the leading edge of the board or of the film is detected, possibly in conjunction with a film edge detector 12, 14 or 11, 13.

According to FIG. 4, the hollow needles 17a, 18a are initially in a waiting position.

Figure 5:
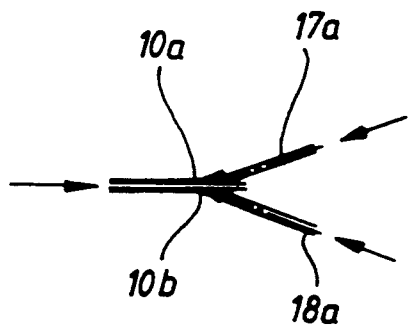
FIG. 5 depicts the approach of the hollow needles to scratch and raise the protective film.

According to FIG. 5, the hollow needles 17a, 18a are applied to the leading edge of the board and there they scratch or peel and slightly raise the protective film 10a, 10b there, with a blast of air used to raise the film.

Figure 6:
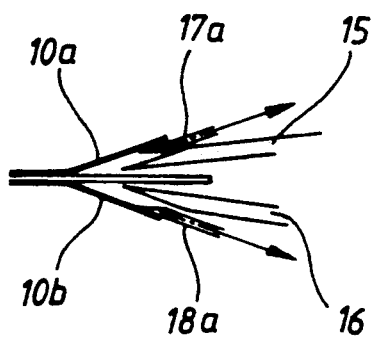
FIG. 6 shows the approach of the guide blades in the scratched region of the protective film with the hollow needles retracted.

In FIG. 6 the needles 17a, 18b are retracted and the film 10a, 10b is lifted onto the blade 15, 16, with the protective film running on top of the blade as the circuit board continues to move through the device.

It can be seen that according to FIGS. 1 through 3 the circuit board 10 or the substrate is, in particular, centrally guided over the intake rollers 2, 4 or 3, 5 and the rollers 6, 8 or 7, 9, with the circuit board very precisely guided and positioned by the four rollers 6, 7, 8, 9. In conjunction with this the blower units 17 and 18 can thus be applied very precisely to the substrate in front of the leading edge of the film.

The film edge detectors 11, 12, 13, 14 have electrical contact monitoring whereby the electrically conductive rollers always initially have low resistance values and then the resistance values become high through contact with the copper surface and through the presence of insulating protective films. The electrically conductive rollers can also be replaced by contact plates.

FIG. 2, in conjunction with FIGS. 4 through 6, reveals that the blower units 17, 18 are guided onto the substrate only a few millimeters in the region of the leading edge of the film. Thus the upper and lower edges of the protective film 10a, 10b are freed from the photopolymer layer, which occurs mechanically on the one hand and through blowing, i.e., through application of compressed air or gas.

Immediately downstream from the two blower units 17, 18, the points of the two guide blades 15, 16 are located such that these points are automatically positioned between the raised protective film 10a, 10b and the substrate 10. This prevents the protective films 10a, 10b from being freed from the substrate over too large an area since thus the electrostatic effects become difficult to control, as in the prior art with a large stripping angle.

In this connection, it is particularly clear from FIGS. 2 through 4 that in this phase of protective film stripping, the substrate is held precisely between the rollers 6, 7, 8, 9 and thus the different holding forces of the protective film can exert no bending moment above and below on the substrate.

In the prior art, it was not possible, in the case of very thin and flexible substrates, to prevent their being transported either upward or downward with the protective film. With the invention, the symmetric arrangement or the centrality of the guide blades 15, 16 prevents unilateral film stripping moments from being exerted on the substrate. Otherwise, in the case of very thin substrates, control of the forward movement is very difficult and the risk exists that contact might be made with the substrate during stripping, with a negative effect on the quality of the surface.

FIG. 1 reveals that to assure the overthrust of the two stripped protective films 10a, 10b over the guide blades 15, 16, film transport rollers 19, 20 are also provided.

The advantageous disposition of the suction units 21, 22 can be seen in FIG. 2, whereby these suction units act on the protective films 10a, 10b, which are lying on the blades 15, 16. The suction units 21, 22 execute the thermal bonding of the protective films to each other, whereby the last protective film stripped is held by the suction units 21, 22 at the appropriate distance from the guide blade 15, 16 and at the instant that the leading edges of the protective films are in the region of the suction units, the suction units are pressed against the guide blades 15, 16 such that the ends of the protective films and the leading edges of the protective films lie on top of each other in each case. In this condition, hot needle elements, not depicted here, or appropriate discharging flashes are used for thermal attachment (without any foreign material), whereby the protective films are penetrated by the hot needle elements and bonded to each other or fusion of the protective films is executed by discharge flashes.

In order to control this brief pause in the winding to bond the protective films positioned one on top of the other without overloading the protective films, appropriate compensation rollers 23, 24 or guide rollers 29, 30 with clamping beams 31, 32 are provided.

Figure 7:
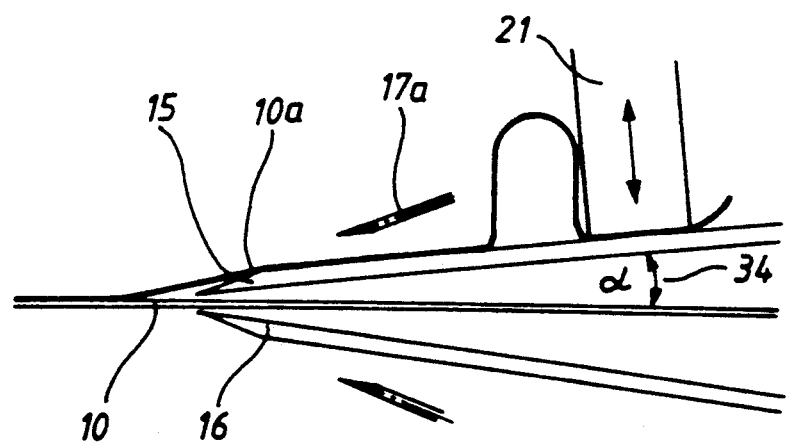
FIG. 7 illustrates lifting of the protective film onto the guide blade with the hollow needles retracted.

The special action of the suction units 21 can be seen in FIG. 7, whereby the protective film 10a is thermally bonded in the manner described with the end of an already stripped protective film with the suction unit 21 coming to rest on the guide blade 15.

FIG. 7 reveals that the angle 34 between the guide blades 15, 16 is very small and thus the protective film 10a, 10b is raised by the points of the guide blades 15, 16 such that only very slight stripping moments act on the circuit board 10.

The circuit boards 10 or the substrates are transported away between the guide blades 15, 16 and, if necessary, are actively supported by a conveyor belt 33. Thus the substrate surfaces freed of the protective films should be protected as well as possible from the effects of mechanical forces and from damage.

FIGS. 8, 9 and 9a depict the uptake of the protective films free of foreign material, whereby according to FIG. 8 the roll 25 is formed on a takeup roller shaft 27, which has a tension cone 27b by means of which tension is applied in advance to the takeup roller shaft 27.

FIG. 9 shows the takeup roller shaft 27 in the relaxed condition, with the tension cone 27b withdrawn according to FIG. 9a, such that the roll can be removed free of foreign material without a core from the takeup roller shaft 27.

The rolling up of the protective films 10a, 10b attached to each other thus occurs in a recycling process, which does away with special roller cores. Instead, the design of the takeup roller shaft 27, 28 makes it possible to remove the rolled protective films without roller cores and thus remove the synthetic material without any foreign material and pass it on for recycling.

The object of the present invention results not merely from the object of the individual claims but also from the combination of the individual claims among each other. All data and characteristics disclosed in the documents, including the summary, in particular the spatial design depicted in the drawings, are claimed as a part of the invention, to the extent that they are novel, individually or in combination, compared to the prior art.

KEY TO THE DRAWINGS

1. Intake platform
2. Feed roller, right (upper)
3. Feed roller, left (upper)
4. Feed roller, right (lower)
5. Feed roller, left (lower)
6. Roller, right (upper)
7. Roller, left (upper)
8. Roller, right (lower)
9. Roller, left (lower)
10. Circuit board
10a. Protective film
10b. Protective film
11. Film leading edge detector
12. Film leading edge detector
13. Film leading edge detector 14. Film leading edge detector
15. Guide blade
16. Guide blade
17. Blower unit
17a. Needle
18. Blower unit
18a. Needle
19. Film transport roller
20. Film transport roller
21. Suction beam, upper
22. Suction beam, lower
23. Compensating roller, upper
24. Compensating roller, lower
25. Takeup reel, upper
26. Takeup reel, lower
27. Takeup reel shaft, upper
27a. Takeup shaft
27b. Tension cone
28. Takeup reel shaft, lower
29. Guide roller, upper
30. Guide roller, lower
31. Clamping beam, upper
32. Clamping beam, lower
33. Conveyor belt
34. Aperture angle
36. Discharge platform

What is claimed is:

1. A process for one- or two-sided stripping of protective films from substrates coated with continuous protective films, comprising:
   scratching the protective film on an edge of the substrate with extensible hollow needles;
   raising the protective film from the substrate at the edge thereof with a blast of air; and
   lifting the protective film while continuously advancing the substrate at a sharp angle to the back of the needle along the hollow needle onto plate-shaped guide blades.

2. The process according to claim 1, further comprising guiding the protective film via a transport mechanism to a takeup reel.

3. The process according to claim 2, wherein the protective films are wound into a coreless roll and thus the rolled protective films are free of foreign material.

4. The process according to claim 2, further comprising thermally bonding the protective film to already stripped protective film.

5. The process according to claim 4, wherein the protective film is thermally bonded without any foreign elements in the beginning stripped region on the guide blades with the end region of a preceding, already stripped protective film.

6. The process according to claim 1, wherein the plate-shaped guide blades are separated by a distance such that even relatively warped substrates can pass through the space between the guide blades in the processing direction.

7. Apparatus for one- or two-sided stripping of protective films from substrates coated with continuous protective films, comprising: means for continuously transporting the substrate, said means comprising rollers; a takeup reel means for taking up the separated protective film; transport means for guiding the protective film to the takeup reel; plate-shaped guide blades located proximate to said rollers for supporting the protective film after it is separated from the substrate; and blower means comprising hollow needles for first scratching the protective film and raising the protective film with a blast of air.

8. The apparatus according to claim 7, wherein the plate-shaped guide blades taper in the beginning region and enclose a sharp angle between them, whereby the guide blades have a greater distance between them in the edge region than in the central region.

9. The apparatus according to claim 7, further comprising a suction beam applied to the peeled protective film on the guide blade, where a beginning region of the stripped protective film is thermally bonded with an end region of a preceding, already stripped protective film.

10. The apparatus according to claim 7, wherein the protective film is transported away starting from the guide blades after thermal bonding to another piece of protective film and guided to takeup reel shafts of the takeup reel means, whereby guide rollers as well as compensating rollers and clamping beams are provided to guide the protective film.

11. The apparatus according to claim 10, wherein the protective film forms a coreless roll free of foreign material, whereby tensible takeup roller shafts are provided.

* * * * *